UNITED STATES PATENT OFFICE.

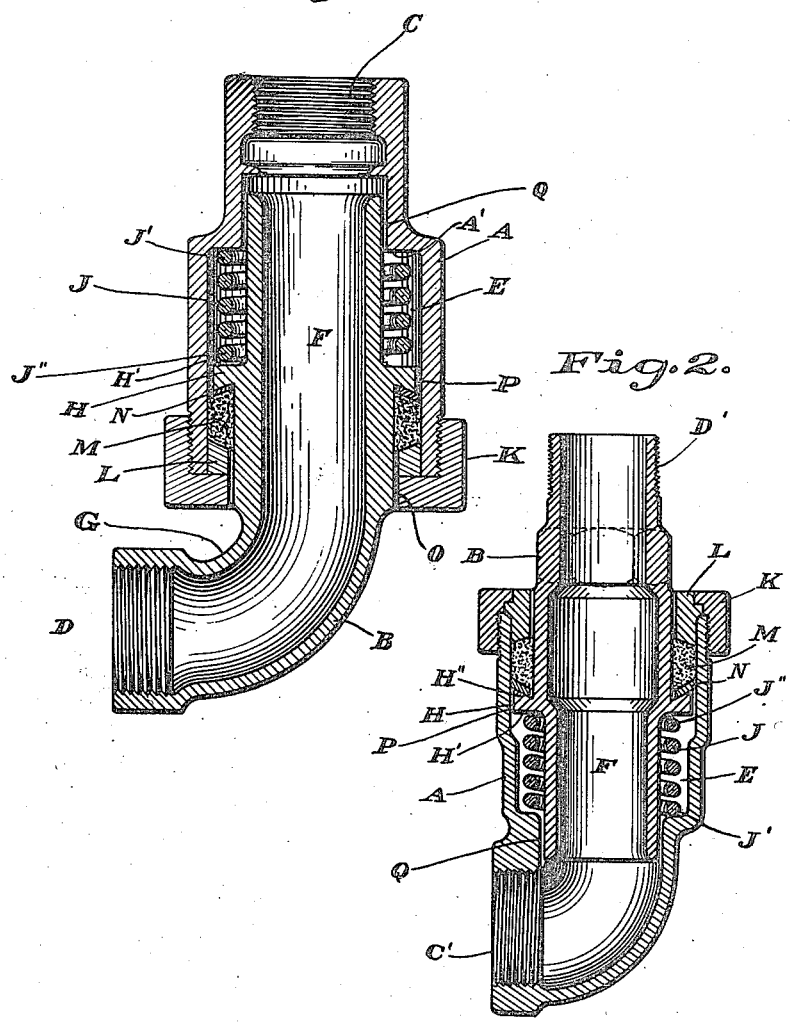

EVARTS G. LOOMIS, OF NEWARK, NEW JERSEY.

PIPE-JOINT.

1,236,457. Specification of Letters Patent. Patented Aug. 14, 1917.

Application filed January 19, 1917. Serial No. 143,222.

*To all whom it may concern:*

Be it known that I, EVARTS G. LOOMIS, a citizen of the United States, and resident of Newark, county of Essex, and State of New Jersey, have invented certain new and useful Improvements in Pipe-Joints, of which the following is a specification.

The invention relates to pipe joints and it has for its object to construct the joint so that it may be placed in a line of piping, such as in steam piping, in a position whereby some of the pipe members can be moved relatively to other pipe members.

The principal object of the invention is to construct the joint in such a manner that it will be durable and also in such a manner that it will not leak steam or other fluid which is being transmitted through the piping.

As showing certain specific embodiments of the invention reference is made to the accompanying drawing forming part of this specification and in which drawing, Figure 1 shows in cross-section a pipe joint with an elbow on the main inner member of the joint; and Fig. 2 shows in cross-section a pipe joint with an elbow on the main outer member of the joint, the main inner member being straight.

Each pipe joint shown comprises an outer main member or an outer casing member A and an inner main member B. Each of these main members is tubular, as will be manifest from an inspection of the drawing, and each main member is also provided at one end with any suitable means whereby each member can be connected to or have connected to it a pipe. The means shown on the drawing are screw-threaded portions C and D (see Fig. 1) and C' and D' (see Fig. 2). Any other suitable connecting means could be employed, if desired. The outer casing member A is counter-bored or cut-out or provided with an enlargement at E into which there extends the throat portion or inner portion F of the inner member B. This inner member B of Fig. 1 is in the form of a goose-neck and has the curved neck portion or elbow G and the throat portion F above referred to, whereas in the form shown in Fig. 2 the inner member B is straight. A compression spring J is located in the cut-out portion E and the rear end J' of this spring is seated against a shoulder A' of the outer casing member A. The forward end J'' of this spring presses against the rear side H' of a shoulder H that is on the inner member B. A nut K is secured to the main outer casing member A, at the forward end of the latter. Between this nut K and the shoulder H there are located, in the following order, a resisting ring or gland L, a packing M, and a wear resisting washer N, preferably of brass. The rear face of the washer N has a surface which conforms to the surface of a sphere; upon this surface there slides the forward surface H'' of the shoulder H. The outer portion of the wear resisting ring M fits the interior of the casing member A but there is play between the inner edge of the wear-resisting ring N and that part of the throat member which is located within and adjacent the inner edge of said ring; in other words, the interior diameter of this wear-resisting ring is greater than the diameter of that portion of the throat member which is within the ring. The spring J pressing against the rear side of the shoulder H forces the shoulder against the rear side of the wear-resisting ring and the ring in turn presses against the rear portion of the packing M thus maintaining the packing compressed between the wear-resisting ring M and the gland L.

In the making up of piping in which the joint is included it is difficult, if not impossible, to connect the pipe members to the different members of the joint in such a manner that there is not a binding or cramping due to some part of the outer casing member A being forcibly engaged by some portion of the main inner member. This may be caused by the axis of the throat member being forced out of alinement with the axis of the outer member. In order to avoid any objectionable features on this account the nut K and gland or resisting ring L may be made so that there is a clearance or play at O between the nut K and gland L on the one hand and the inner member B. There is also purposely left a play or clearance at P and Q between the interior of the outer member A and the exterior of the inner member B. When the movement out of alinement takes place the shoulder H slides upon the wear-resisting ring N and there is no substantial displacement or distortion of the packing, sidewise or otherwise, resulting from the movement of the shoulder H relative to the packing. Moreover, the spring pressing the shoulder H, which has a spherical surface that engages the spherical surface on the rear side of the wear-resisting ring N, maintains the packing which is between the wear-resisting ring N and the gland L under a consistent and uniform pressure and this pressure is sufficient to maintain a tight joint at all times between the packing and the portions of the outer and inner members which are engaged by the packing. It will be manifest that the invention can be realized in various forms without departing from the spirit and scope thereof; for example, the inner member might have the curved neck or the outer member might have the curved neck, or both might have the curved neck, or both might be straight members.

An important feature of the invention resides in the inserting of the anti-friction wear-resisting washer or ring between the packing and the shoulder which is pressed by the spring.

What I claim and desire to secure by Letters Patent of the United States is:—

1. A pipe joint comprising an outer casing member provided with a cut-out portion and having a nut and a resisting ring or gland, an inner member having an enlargement or shoulder, a spring located in said cut-out portion, which spring is seated at one end on said outer member the other end of which spring presses against the inner member, packing between said gland and said shoulder, and a wear-resisting ring engaging the rear side of said packing, which wear-resisting ring is engaged on its rear face by the forward surface of said shoulder, the forward surface of said shoulder and the rear surface of said wear-resisting ring conforming to the surface of a sphere.

2. A pipe joint having inner and outer members, one of which is provided with a resisting ring or gland the other of which is provided with a pressing shoulder, a spring engaging the rear side of said shoulder and forcing the shoulder toward said resisting ring or gland, packing between said resisting ring or gland and said shoulder, and a wear-resisting ring between said packing and said shoulder, which wear-resisting ring has a spherical surface at its side which is engaged by a correspondingly shaped surface at the forward side of the shoulder.

3. A pipe joint of the class described comprising in combination coöperating members, one an inner member and the other an outer member, one of said members having a nut carrying a resisting ring or gland the other of said members carrying a shoulder, a compression spring between said members, a packing between said gland and said shoulder, and a wear-resisting ring engaging the rear side of said packing and the forward side of said shoulder, which wear-resisting ring fits one of said members but is constructed so that there is a clearance or play between it and the other of said members, there being a clearance between the shoulder and the member with which the wear-resisting member fits, the construction being such that the spring continuously forces the shoulder forwardly against the rear of the wear-resisting ring.

4. A pipe joint of the class described comprising in combination coöperating members, one being an inner member and the other an outer member said outer member having a nut carrying a resisting ring or gland, the other of said members carrying a shoulder, a compression spring between said members, a packing between said resisting ring or gland and said shoulder, and a second ring engaging the rear side of said packing and the forward side of said shoulder, said second ring fitting the outer member and being constructed so that there is a clearance or play between said ring and the inner member; there being a clearance between the exterior portions of the inner member and the interior portions of the outer member, the spring construction being such that it continuously forces the shoulder forwardly against the rear of the second ring.

This specification signed and witnessed this 18th day of January, A. D. 1917.

EVARTS G. LOOMIS.

Signed in the presence of—
    EDWIN A. PACKARD,
    G. MCGRANN.